D. W. BOWE.
MOLDING APPARATUS FOR FENCE POSTS.
APPLICATION FILED JUNE 21, 1916.

1,216,934.

Patented Feb. 20, 1917.
2 SHEETS—SHEET 1.

Witnesses

D. W. Bowe
Inventor, by
Attorneys.

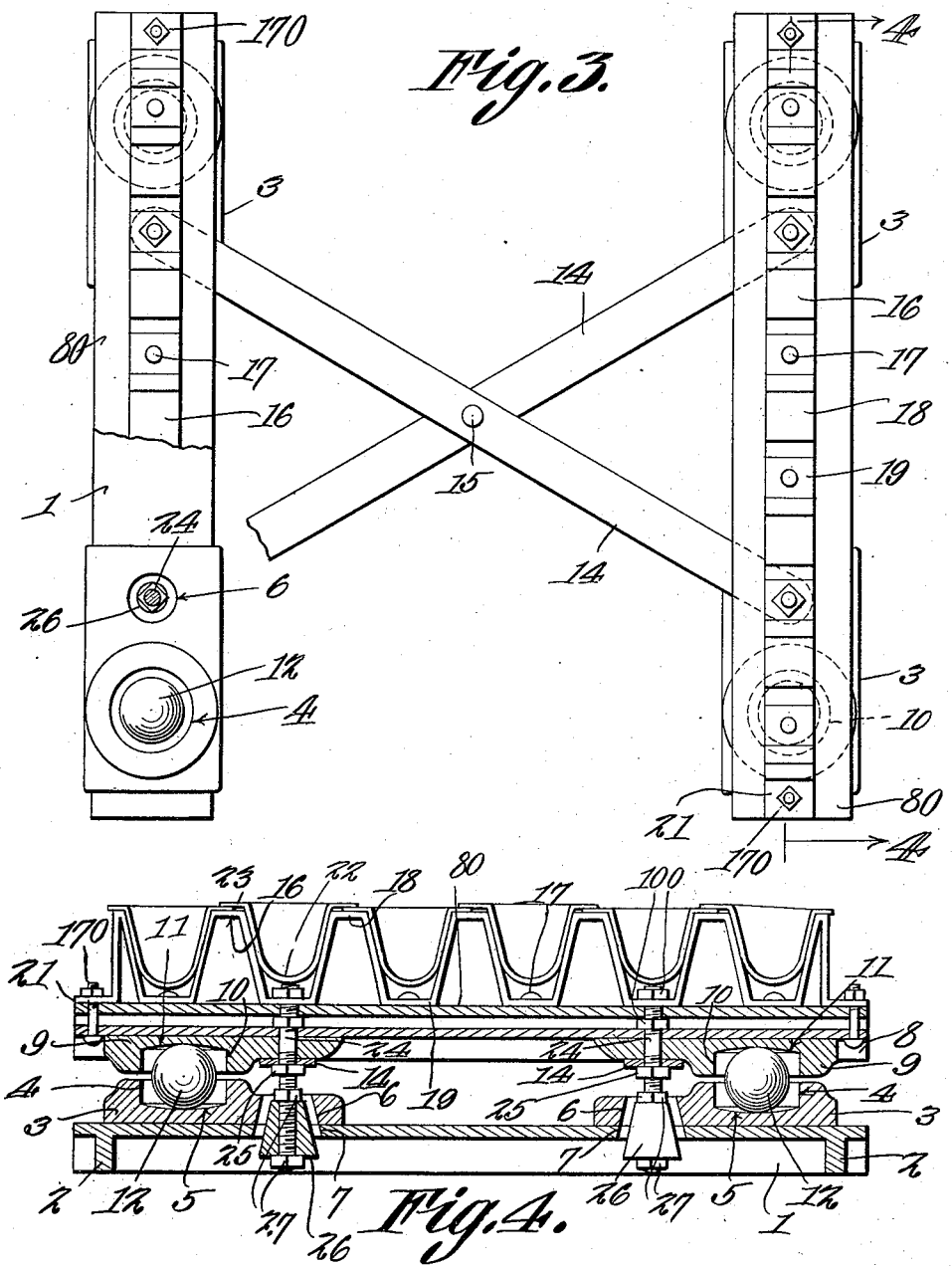

UNITED STATES PATENT OFFICE.

DAVID W. BOWE, OF TOLEDO, OHIO.

MOLDING APPARATUS FOR FENCE-POSTS.

1,216,934.  Specification of Letters Patent.  Patented Feb. 20, 1917.

Application filed June 21, 1916. Serial No. 105,012.

*To all whom it may concern:*

Be it known that I, DAVID W. BOWE, a citizen of the United States, residing at Toledo, in the county of Lucas and State of Ohio, have invented a new and useful Molding Apparatus for Fence-Posts, of which the following is a specification.

The device forming the subject matter of this application is a molding apparatus of that general sort in which fence posts and like elements are fashioned.

The invention aims to provide novel means whereby a limited reciprocating movement may be imparted to the molds, to impart a jarring or shaking action thereto, so that the concrete in the molds will be caused to settle into a compact mass.

Another object of the invention is to provide novel means for limiting the movement between the frame which carries the mold, and the base on which the frame is adapted to move.

Another object of the invention is to provide an improved form of frame adapted to carry the molds and to be mounted for limited reciprocatory movement.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 3 is a top plan, wherein the molds have been removed, parts being broken away; and Fig. 4 is a section taken approximately on the line 4—4 of Fig. 3.

Figure 1:
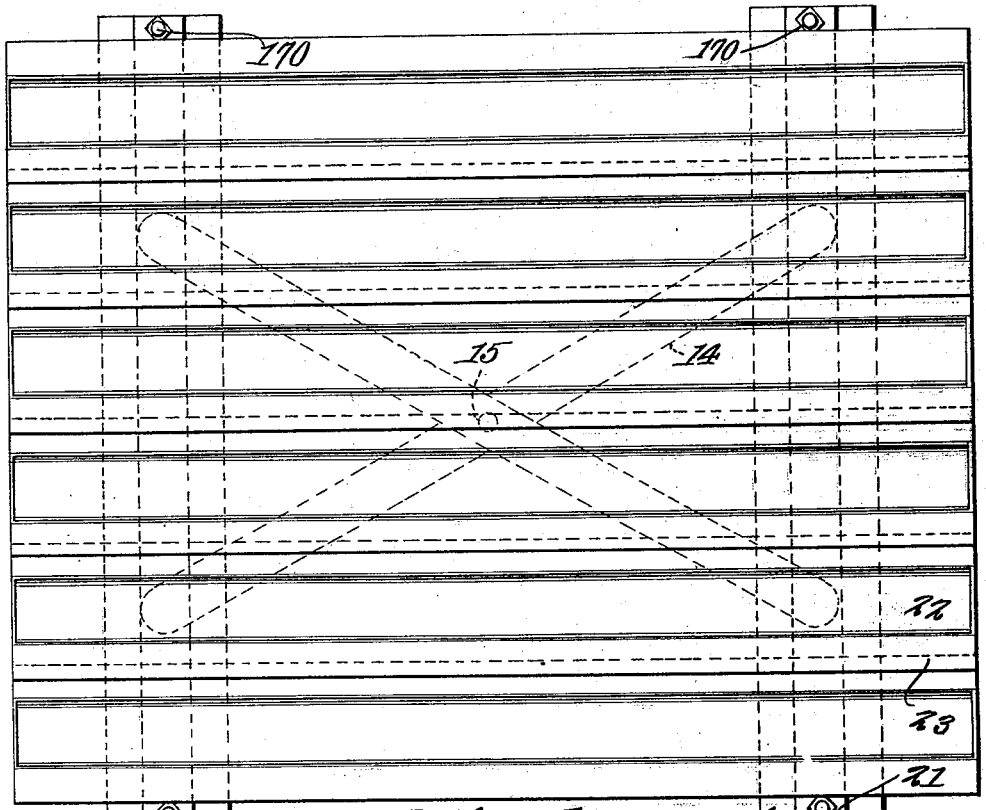
Figure 1 shows in top plan, a molding apparatus constructed in accordance with the present invention.
Figure 2:
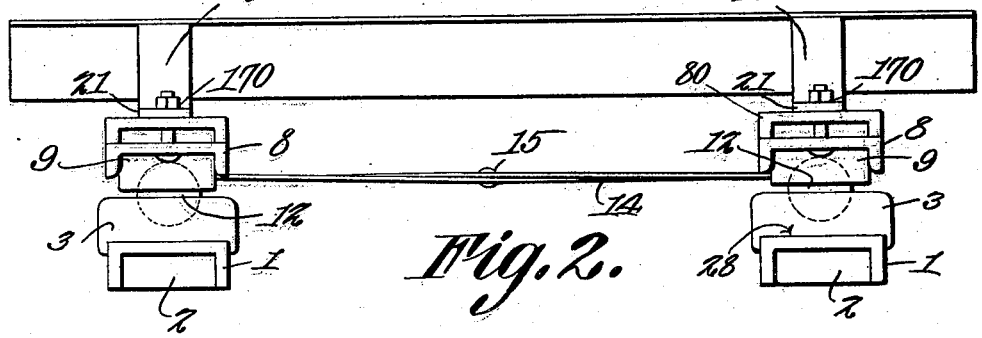
Fig. 2 is an elevation of the structure shown in Fig. 1.

In carrying out the invention there is provided a base which may be in the form of a pair of channels 1, internally reinforced adjacent their ends by cross plates 2. Superposed upon and secured to the channels 1 are bearing members 3. As indicated at 28 in Fig. 2, the bearing members 3 may be cut away on their lower faces so that the channels 1 will fit into the bearing members. In the upper faces of the bearing members 3, recesses 4 are fashioned, the bottoms 5 of the recesses preferably being concaved downwardly. In the bearing members 3 to one side of the recesses 4, conical openings 6 are formed, the same being alined with openings 7 in the tops of the channels 1.

A frame is located above the base hereinbefore described, and this frame may comprise a pair of channels 8. Secured to the under faces of the channels 8 and located between the depending flanges thereof are bearings 9, in the lower faces of which, recesses 10 are formed, the tops of the recesses being upwardly concaved, as shown at 11. Balls 12 are located in the recesses 10 and 4, and thus the frame is supported for limited horizontal movement on the base. Since the bottoms 5 of the recesses 4 and the tops 11 of the recesses 10 are concaved, as hereinbefore described, the balls 12 tend to remain centered with respect to the recesses, when the movement of the frame with respect to the base ceases. The channels 8 which go to make up the frame may be united by cross braces 14, fastened at their point of crossing by means of a rivet 15 or the like. The specific means whereby the ends of the braces 14 are assembled with the channels 8 of the frame will be described hereinafter. Channels 80 are mounted on the channels 8 and are terminally secured thereto by bolts 170.

Mounted on the channels 80 of the frame are mold holders, preferably in the form of sinuous strips 16 including top members 18, bottom members 19, side pieces 20 connecting the top members 18 with the bottom members 19, and terminal feet 21 at the ends of the strips. The bolts 170 may pass through the feet 21. Attaching elements 17 unite certain of the bottom members 19 of the strips 16 with the channels 80 of the frame.

Disposed between the side pieces 20 of the mold holders are molds 22 which may be provided along their longitudinal edges with flanges 23 including the top members 18 of the mold holders. Extended through certain of the bottom members 19 of the mold holders, through the tops of the channels 8 and 80 and through the bearings 9 are securing elements 24 which may be bolts. Nuts 100 on the bolts engaging the bottom members of the mold holders and the channels 80 as clearly shown in Fig. 4. These securing elements or bolts 24 pass through the ends of the cross braces 14 and hold the same on the lower faces of the bearings 9, nuts 25 being threaded onto the bolts, the nuts 25 engaging the ends of the braces 14 as shown in Fig. 4. The threaded portions of the bolts or securing elements 24 extend downwardly through the conical openings 6 in the bearings 3. Cones 26 are mounted on the bolts 24 and enter the conical openings 6. Nuts 27 are threaded onto the bolts and engage both ends of the cones 26.

In practical operation, the frame comprising the channels 8 and 80 and attendant parts, may be reciprocated on the base made up of the channels 1, the balls 12 rolling about in the recesses 10 and 4. A reciprocating or shaking movement thus may be imparted to the frame and to the molds 22 which are carried by the frame, the material in the molds thus being shaken down and compacted in a manner which will be obvious to those skilled in the art. The lateral movement of the mold-carrying frame with respect to the base is limited by the engagement between the cones 26 and the walls of the openings 6. By rotating the nuts 27, the cones 26 may be moved up and down, and in this way, the amount of movement which the mold carrying frame has with respect to the base, may be limited.

It is to be observed that the conical openings 6 are located in the bearing members 3, which are relatively heavy. Owing to the construction above mentioned, the strength of the structure thus is promoted. In addition to the foregoing advantage, it is to be observed that the bolts 24 exercise several functions. First, they constitute a support for the cones 26. Secondly, they constitute means whereby the cross braces 14 are held on the channels 8. Thirdly, the bolts 24 constitute an efficient means whereby the sinuous strips 16 (mold holders) are retained on the channels 80 of the reciprocating frame.

By loosening the bolts 170, the channels 80 and the mold holders may be removed, an operation which is desirable when the mold holders must be changed to accommodate a different kind of mold from that shown.

Having thus described the invention, what is claimed is:—

1. In a device of the class described, a base; a frame disposed above the base; a concrete mold carried by the frame; rolling members interposed between the base and the frame; and interengaging elements on the base and the frame coöperating to limit the movement of the frame with respect to the base and to impart a jar to the mold.

2. In a device of the class described, coöperating elements comprising a base and a frame disposed above the base; a concrete mold carried by the frame; rolling members interposed between the base and the frame; a stem depending from one of said coöperating elements; the other of said coöperating elements being provided with a conical recess into which the stem projects; a cone adapted to coöperate with the recess to limit the movement of the frame with respect to the base; the cone being adjustable longitudinally of the stem; and means for holding the cone in adjusted position longitudinally of the stem.

3. In a device of the class described, a frame made up of spaced members; braces connecting said spaced members; securing elements uniting the braces with said spaced members; cones mounted on the securing elements for adjustment longitudinally thereof; and means for holding the cones in adjusted positions longitudinally of the securing elements, the base being provided with recesses in which the cones have limited movement; and rolling elements interposed between the base and the frame, the cones coöperating with the recesses to limit the movement of the frame with respect to the base on the rolling elements; and a concrete mold carried by the frame.

4. In a device of the class described, a base; a frame disposed above the base; a concrete mold carried by the frame; rolling elements interposed between the base and the frame; a stem projecting from the frame; a stop member adjustable longitudinally of the stem; and means for holding the stop member in adjusted positions longitudinally of the stem; the base having an opening in which the stop member is received, the stop member and said opening being tapered relative to each other, whereby when the stop member is moved longitudinally of the stem, the movement of the frame with respect to the base will be adjusted.

5. In a device of the class described, a base; a frame made up of spaced members; braces connecting the spaced members; mold holders on said spaced members; a concrete mold supported by the mold holders; securing elements uniting the mold holders and the braces with said spaced members; stop members movable longitudinally of the securing elements; and means for holding the stop members in adjusted positions longitudinally of the securing elements; the base having openings in which the stop members are received, the stop members and the recesses being relatively tapered, whereby when the stop members are moved longitudinally of the securing elements, the movement of the frame with respect to the base will be adjusted; and rolling elements interposed between the base and the frame.

In testimony that I claim the foregoing as my own, I have hereto affixed my signature in the presence of two witnesses.

DAVID W. BOWE.

Witnesses:
FLORENCE MURRELL,
MAURICE ALLEN.

Copies of this patent may be obtained for five cents each, by addressing the "Commissioner of Patents, Washington, D. C."